(12) United States Patent
Choi et al.

(10) Patent No.: US 7,869,117 B2
(45) Date of Patent: Jan. 11, 2011

(54) ELECTROPHORETIC DISPLAY DEVICE

(75) Inventors: Jae-young Choi, Yongin-si (KR);
Jai-yong Han, Yongin-si (KR)

(73) Assignee: Samsung Electronics Co., Ltd. (KR)

( * ) Notice: Subject to any disclaimer, the term of this patent is extended or adjusted under 35 U.S.C. 154(b) by 251 days.

(21) Appl. No.: 12/126,506

(22) Filed: May 23, 2008

(65) Prior Publication Data
US 2009/0034056 A1 Feb. 5, 2009

(30) Foreign Application Priority Data
Aug. 1, 2007 (KR) ...................... 10-2007-0077458

(51) Int. Cl.
*G02B 26/00* (2006.01)
*G09G 3/34* (2006.01)
(52) U.S. Cl. ...................... 359/296; 359/452; 359/228; 345/107; 353/31; 250/458.1; 313/509; 313/496
(58) Field of Classification Search ................ 359/228, 359/245, 253, 296, 452; 345/105–108, 207, 345/690; 313/509; 252/572; 250/458.1, 250/461.1; 430/32
See application file for complete search history.

(56) References Cited
U.S. PATENT DOCUMENTS

| | | | |
|---|---|---|---|
| 6,300,932 B1 * | 10/2001 | Albert ........................ 345/107 |
| 6,727,881 B1 | 4/2004 | Albert et al. |
| 6,781,308 B2 * | 8/2004 | Hayashi ....................... 313/582 |
| 6,812,636 B2 * | 11/2004 | Porter et al. ................. 313/496 |
| 7,002,289 B1 * | 2/2006 | Porter et al. ................. 313/496 |
| 7,015,893 B2 * | 3/2006 | Li et al. ...................... 345/107 |
| 7,382,351 B2 * | 6/2008 | Kishi .......................... 345/107 |
| 7,463,408 B2 * | 12/2008 | Johnson et al. ............. 359/296 |
| 7,502,162 B2 * | 3/2009 | Lin et al. ..................... 359/296 |
| 7,537,346 B2 * | 5/2009 | Liu et al. ...................... 353/31 |
| 7,616,185 B2 * | 11/2009 | Yamaguchi et al. ......... 345/107 |
| 2004/0150613 A1 | 8/2004 | Li et al. |
| 2009/0046051 A1 * | 2/2009 | Choi et al. .................. 345/107 |

\* cited by examiner

*Primary Examiner*—Loha Ben
(74) *Attorney, Agent, or Firm*—Cantor Colburn LLP (57) ABSTRACT

Provided is an electrophoretic display device. The electrophoretic display device includes a first substrate and a second substrate forming a space receiving electrophoretic particles, and a first electrode and a second electrode formed on the first substrate and the second substrate respectively. The electrophoretic particles include reflective particles having a first electric polarity and reflecting a first light in visible wavelength bands, and light emission particles having a second electric polarity and emitting a second light by an optical stimulation. The first and second lights are in a substantially same color range of wavelength in a same pixel region.

19 Claims, 6 Drawing Sheets

ELECTROPHORETIC DISPLAY DEVICE

This application claims priority to Korean Patent Application No. 10-2007-0077458, filed on Aug. 1, 2007, and all the benefits accruing therefrom, the contents of which in its entirety is incorporated herein by reference.

BACKGROUND OF THE INVENTION

This disclosure relates to an electrophoretic display device.

Reflective displays can realize flexible displays with low costs, and show low power consumption. Therefore, reflective displays are often used as display devices in low power mobile displays. The reflective displays can be electrophoretic displays (EPDs), liquid crystal displays (LCDs), electrowetting displays (EWD), and electrochromic displays (ECD). Among the above, the most advanced reflective display is the EPD that uses movements of particles to effect a reflective display.

Since the reflective display displays images by reflecting external lights, the reflective display can be used only when the external lights exist, and cannot be used in a dark space without external light. It is therefore difficult to use such displays at night. Therefore, a display device that operates as a light emission display where there is no external light is desired.

U.S. Pat. No. 6,727,881 discloses an electrophoretic display, in which a capsule includes electroluminescence (EL) particles and particles blocking the light emitted from the EL particles. In this display, light of desired color can be emitted or blocked in the light emission mode. However, light of a desired color cannot be reflected or blocked in the reflection mode.

U.S. Patent Application Publication No. 20040150613 discloses an electrophoretic display that includes reflective particles and photoluminescence (PL) particles having same charges that are disposed in a cell. In this display, when a voltage is applied to an electrode, the reflective particles and the PL particles move simultaneously. In the light emission mode, the two types of particles are located on an upper portion of a pixel by the applied voltage, and ultraviolet (UV) rays are irradiated from a backlight unit (BLU) to emit the light of desired color. In addition, if the color representation is not desired, the BLU is turned off. However, in the reflection mode, when the voltage is applied so that the two types of particles can locate on the upper portion of the pixel, the reflective particles interact with external light and produce a color that is a composite of the external light and that produced by the particles. In this display device, among the particles located on the upper portion of the pixel, the PL particles contribute to the display of images only in the light emission mode and the reflective particles contribute to the display of images in the reflection mode only. This operational property causes a degradation of color emission due to the PL particles or the reflective particles that do not participate in the color emission, when the color is emitted in the light emission mode or in the reflection mode.

SUMMARY OF THE INVENTION

In one aspect, the present invention provides an electrophoretic display device that can represent two colors in a reflection mode and two colors in a light emission mode using at least two types of particles that move in different directions under an electric field.

In another aspect, the present invention provides an electrophoretic display device, which can display images both in a dark place as well as in a well light bright place.

Disclosed is an electrophoretic display device comprising: a plurality of pixel regions; reflective particles formed in the pixel region, the reflective particles having a first electric polarity and reflecting a first light in visible wavelengths of the electromagnetic spectrum; and light emission particles formed in the pixel region, the light emission particle having a second electric polarity and emitting a second light by optical stimulation, the first and second lights being emitted from a first pixel region and being of a substantially similar wavelength in substantially the same pixel region.

Disclosed is an electrophoretic display device comprising: a first substrate and a second substrate forming a space therebetween for receiving electrophoretic particles; a first electrode and a second electrode formed on the first substrate and the second substrate respectively, and the first and second electrodes defining a plurality of pixel regions, wherein the electrophoretic particles include reflective particles having a first electric polarity and reflecting a first light in a visible wavelength regime of the electromagnetic spectrum; and light emission particles having a second electric polarity and emitting a second light by optical stimulation, the first and second lights being emitted from a first pixel region and being of a substantially similar wavelength in substantially the same pixel region.

The light emission particle includes a light emitting material emitting the second light and a coating layer coated on the light emitting material, wherein the coating layer transmits the optical stimulation and the second light emitted from the light emitting material.

According to an exemplary embodiment, the light emitting material includes a photoluminescence (PL) material.

According to an exemplary embodiment, the PL material includes a material emitting a blue color, a green color or a red color by the optical stimulation.

According to an exemplary embodiment, the coating layer reflects a white light.

According to an exemplary embodiment, the reflective particle includes a first material reflecting the first light and a second material absorbing the optical stimulation.

According to an exemplary embodiment, the first material reflects a light blue color, a light of green color, or a light of red color.

Disclosed herein is an electrophoretic display device including: a plurality of pixel regions; reflective particles having a first electric polarity to reflect light in the visible regime of the electromagnetic spectrum; the reflective particles being formed on the pixel regions; and light emission particles having a second electric polarity and emitting lights by external optical stimulation; the light emission particles being formed on the pixel regions.

Disclosed is an electrophoretic display device including: a first substrate and a second substrate forming a space therebetween for receiving electrophoretic particles; and an electrode structure including a first electrode and a second electrode respectively formed on the first substrate and the second substrate, and defining a plurality of pixel regions that can be electrically addressed between the first substrate and the second substrate, wherein the electrophoretic particles include: reflective particles having a first electric polarity to reflect light in the visible regime of the electromagnetic spectrum; and light emission particles having a second electric polarity and emitting lights by external optical stimulation; the light emission particles being formed on the pixel regions.

The reflective particle may absorb external lights or lights emitted from the light emission particles, and may reflect or transmit the light of a desired color. In addition, the reflective particle may include a UV-absorbing material to absorb the UV rays from the outside or the UV ray emitted from the backlight unit, which is not absorbed by the light emission particle. The reflective particle may reflect red, blue, or green light. Therefore, the reflective particle may include a red, green, or blue light reflective material and the UV-absorbing material, and thus, absorb the visible light rays except for those wavelengths that are reflected by the reflective particle and certain UV rays.

The light emission particle may reflect the white light, and emit visible rays such as red, blue, or green light by the UV ray. The light emission particle may include a red, blue, or green photoluminescence (PL) material and a coating layer.

The coating layer may reflect the white light, and transmit the UV rays and the lights emitted from the light emission source.

The light emission particle may reflect the light having a wavelength that is different from that of the light reflected by the reflective particle. The light emission particle may include a light emission material and a coating layer covering the light emission material, and the coating layer may be white to transmit the UV rays and the lights emitted from the inner light emission source.

The light emission particle may receive a PL quantum dot (QD) emitting the light by an optical stimulation of the outside or the PL particle.

The electrode structure may include X-Y matrix type electrode structure, or an active matrix type electrode structure including an active device such as a transistor.

BRIEF DESCRIPTION OF THE DRAWINGS

The above and other features and advantages of the disclosed embodiments will become more apparent by describing in detail exemplary embodiments thereof with reference to the attached drawings, in which.

DETAILED DESCRIPTION OF THE EXEMPLARY EMBODIMENTS

Hereinafter, disclosed embodiments will be described with reference to accompanying drawings, in which exemplary embodiments are shown.

It will be understood that when an element is referred to as being "on" another element, it can be directly on the other element or intervening elements may be present therebetween. In contrast, when an element is referred to as being "disposed on" or "formed on" another element, the elements are understood to be in at least partial contact with each other, unless otherwise specified.

The terminology used herein is for the purpose of describing particular embodiments only and is not intended to be limiting of the invention. As used herein, the singular forms "a", "an" and "the" are intended to include the plural forms as well, unless the context clearly indicates otherwise. The use of the terms "first", "second", and the like do not imply any particular order, but are included to identify individual elements. It will be further understood that the terms "comprises" and/or "comprising", or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

In the drawings, like reference numerals in the drawings denote like elements and the thicknesses of layer and regions are exaggerated for clarity.

According to an exemplary embodiment, two types of electrophoretic particles having different polarities are employed. The two types of particles move in opposite directions in an electric field to display images. The images are displayed in a reflection mode using external lights, and in a light emission mode using a backlight in a case where there is no external light.

The reflective particle and the light emission particle have opposite electric properties, i.e., they have charges of opposite polarities, and reflect and emit the lights in different wavelength bands from each other.

The reflective particle reflects or transmits red, blue, or green light, and can absorb ultraviolet (UV) rays.

The light emission particle absorbs an external optical stimulation, for example, the ultraviolet (UV) regime of the electromagnetic spectrum, and emits visible rays, for example, red, green, and blue light. A wavelength of the light emitted from the light emission particle can include similar wavelengths of the light to those which can be reflected by the reflective particle. In addition, the light emitted from the light emission particle can be a white light including all bands in visible regime of the electromagnetic spectrum.

In the reflection mode, the light emission particle acts as a reflective particle to reflect a light of wavelength that is different from the light reflected by the reflective particle. For example, the reflective particle reflects the blue light and the light emission particle reflects a white light, and thus blue and white colors can be displayed.

In the light emission mode, the reflective particle reflects the light emitted from the light emission particle to represent the red, blue, and green colors, and absorbs and blocks the UV rays from the backlight unit via the light emission particle. As described above, when the UV rays are absorbed and blocked by the reflective particle, a dark color, that is, black color, is displayed, and thus, the black, green, blue, and green can be represented in the light emission mode.

The display device can use a glass substrate or a plastic substrate, but is not limited thereto. The plastic substrate can be formed from optically transparent plastics, for example, polyethylene terephthalate (PET), polymethylmethacrylate (PMMA), polystyrene (PS), polycarbonate (PC), polyethylene naphthalate (PEN), or polyethersulfone (PES). In addition, the width of the substrate ranges 10 to 1000 microemeters (am). Exemplary glass substrates are silica, quartz, or other optically transparent glass substrates.

Figure 1:
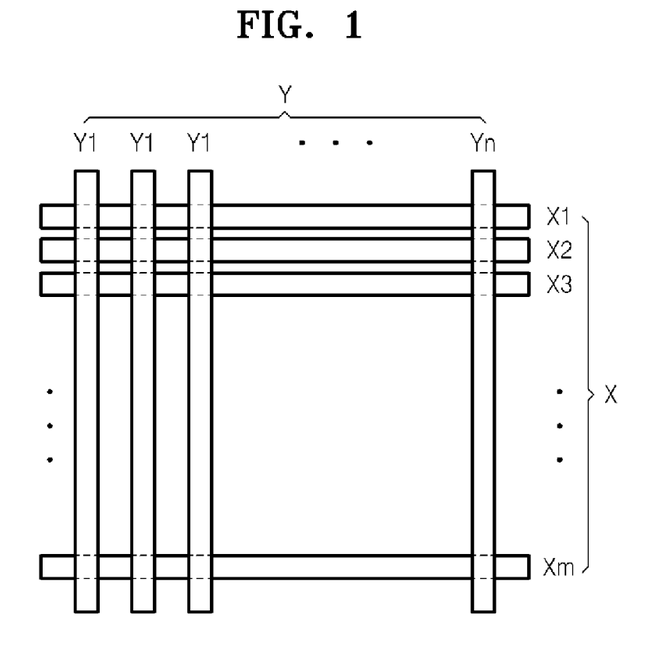
FIGS. 1 and 2 are exemplary schematic diagrams showing electrode arrangement structures in an electrophoretic display device according to an embodiment of the present invention.
Figure 2:
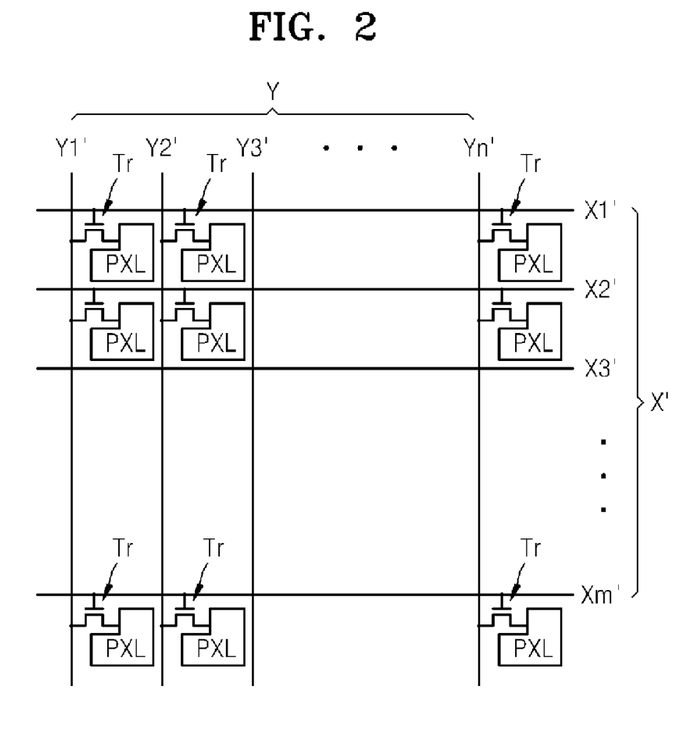

FIGS. 1 and 2 are diagrams showing electrode arrangement structures that can be applied to the electrophoretic display device according to an embodiment of the present invention.

FIG. 1 shows the electrode arrangement in a passive matrix type, and FIG. 2 shows the electrode arrangement in an active matrix type.

The passive matrix type electrode arrangement structure includes a first electrode arrangement X having a plurality of electrodes (X1, X2, X3, ~, Xm) in a first direction and a second electrode arrangement (Y) having a plurality of electrodes (Y1, Y2, Y3, ~, Yn) in a second direction that intersects the first direction at a right angle. As well known in the art, in the passive matrix type, the unit pixels are defined at portions where the first electrode arrangement X and the second electrode arrangement Y intersect each other.

The active matrix type includes a first electrode arrangement X' and a second electrode arrangement Y' as in the passive matrix type. Each of unit pixels includes a transistor (Tr) disposed on a portion where each of the electrodes (X1', X2', X3', ~, Xm) of the first electrode arrangement X' and each of the electrodes (Y1', Y2', Y3', ~, Yn) of the second electrode arrangement Y' intersect each other. A pixel electrode (PXL) is connected to the transistor Tr. A region representing the colors is determined by the pixel electrode PXL connected to the transistor Tr. The structure of the active matrix shown in FIG. 2 is substantially the same as the electrode structure of general liquid crystal displays (LCDs).

The electrophoretic display device is not limited to any specific electrode arrangement structure. Hereinafter, a structure and operations of a unit pixel will be described. Then, the electrophoretic display device that is composed of the unit pixels will be explained.

Figure 3A:
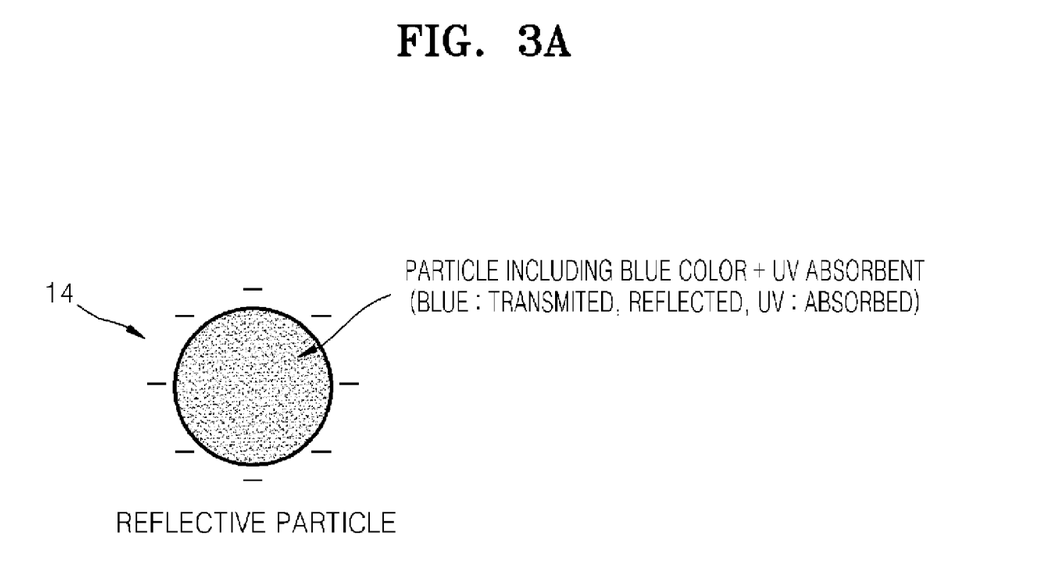
FIGS. 3A and 3B are diagrams showing an exemplary electrophoretic reflective particle and a light emission particle in the electrophoretic display device.
Figure 3B:
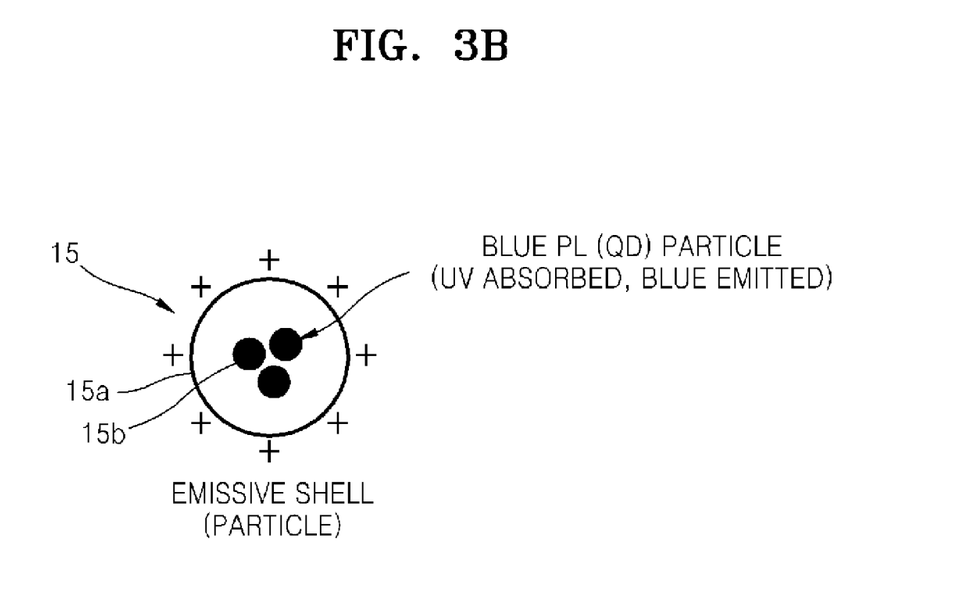

FIGS. 3A and 3B are diagrams showing electrophoretic particles 14 and 15. Reference numeral 14 denotes a reflective particle having a first electric property, for example, negative charges, and reference numeral 15 denotes a light emission particle having a second electric property, for example, positive charges.

The reflective particle 14 includes a pigment or a dye, and thus, reflects a light of a certain color, for example, blue light in case of a blue pixel. Here, the reflective particle 14 includes a UV absorbing material and absorbs visible rays except for the blue light.

The light emission particle 15 includes a coating layer 15a and an emissive material, for example, a photoluminescence (PL) material 15b within the coating layer 15a. The PL material 15b emits a light of designated wavelength by an optical stimulation from outside, for example, the UV rays from the backlight unit. The emitted light has a wavelength of white color or blue color, and includes at least the wavelength of the light, which can be reflected by the reflective particle 14. The coating layer 15a transmits the UV rays so that the UV rays from the outside can reach the PL material, and transmits the light emitted from the PL material 15b. Therefore, the coating layer 15a may be white, and can be formed of a white material such as $TiO_2$.

Example materials for forming the reflective particle 14 and the light emission particle 15 are as follows.

1. Reflective Particle materials reflecting red (R) light:

red oxide, cadmium red, diachylon, mercury sulfide, cadmium, permanent red 4R, lithol red, pyrazolone red, watching red, calcium salt, lake red D, brilliant carmine 6B, eosin lake, rhodamine lake B, alizarin lake, brilliant carmine 3B, C.I. pigment red 2, Oil red dye, or combinations thereof.

materials reflecting green (G) light:

chrome green, chromium oxide, pigment green B, C.I pigment green 7, malachite green lake, final yellow green G, Malachite Green, or combinations thereof.

materials reflecting blue (B) light:

C.I. pigment blue 15:3, C.I. pigment blue 15, Berlin blue, cobalt blue, alkali blue lake, Victoria blue lake, phthalocyanine blue, metal-free phtahlocyanine blue, first sky blue, and Indunsren blue BC, Oil Blue dye, or combinations thereof.

UV absorbents:

2,4-dihydroxybenzophenone, 2-benzyl benziminazole-5-sulfonic acid, 2-(2H-benzotriazol-2-yl)-4,6-bis(1-menthyl-1-phenylethyl)phenol, 2-(2H-benzotriazol-2-yl)-6-(dodecyl)-4-methylphenol, 2-hydroxy-4-n-octoxy benzophenone, 2-hydroxy-4-methoxy-benzophenone, 2-(2'-hydroxy-3'-tert-butyl-5'-methylphenyl)-5-chlorobenzotriazole, 2-(2'-hydroxy-5'-methylphenyl)benzotriazole, 2-(2'-hydroxy-5'-tert-octylphenyl)benzotriazole, 2-(2H-benzotriazol-z-yl)-4,6-di-tert-pentylphenyl, PABA (aminobenzoic acid) derivatives and cinnamate derivatives, salicylic acid derivatives, benzophenone and derivatives thereof, anthranilate and derivatives thereof, or combinations thereof.

2. Light Emission Particle

Red PL: at least one inorganic fluorescent material or quantum dot selected from the group consisting of $(Sr,Ca,Ba,Mg)P_2O_7:Eu^{2+},Mn^{2+}$; $CaLa_2S_4:Ce^{3+}$; $SrY_2S_4: Eu^{2+}$; $(Ca,Sr)S: Eu^{2+}$; $SrS:Eu^{2+}$; $Y_2O_3: Eu^{3+},Bi^{3+}$; $YVO_4:Eu^{3+},Bi^{3+}$; $Y_2O_2S:Eu^{3+}, Bi^{3+}$; $Y_2O_2S:Eu^{3+}$. The quantum dot can be a II-VI compound such as CdSe, CdTe, CdS, ZnSe, ZnTe, ZnS, HgTe, or HgS, and can have a core-shell structure. Here, the core includes a material selected from the group consisting of CdSe, CdTe, CdS, ZnSe, ZnTe, ZnS, HgTe, and HgS, and the shell includes a material selected from the group consisting of CdSe, CdTe, CdS, ZnSe, ZnTe, ZnS, HgTe, and HgS. In addition, the quantum dot can be a III-V compound such as GaN, InP, InAs, GaAs, GaP, or GaInP.

Green PL: at least an inorganic fluorescent material or a quantum dot selected from the group consisting of $YBO3:Ce^{3+},Tb^{3+}$; $BaMgAl_{10}O_{17}:Eu^{2+}, Mn^{2+}$; $(Sr,Ca,Ba)(Al,Ga)_2S_4:Eu^{2+}$; $ZnS:Cu,Al$; $Ca_8Mg(SiO_4)_4Cl_2:Eu^{2+},Mn^{2+}$; $Ba_2SiO_4: Eu^{2+}$; $(Ba,Sr)_2SiO_4:Eu^{2+}$; $Ba_2(Mg, Zn)Si_2O_7:Eu^{2+}$; $(Ba,Sr)Al_2O_4: Eu^{2+}$; $Sr_2Si_3O_8.2SrCl_2:Eu^{2+}$. The quantum dot can be a II-VI compound such as CdSe, CdTe, CdS, ZnSe, ZnTe, ZnS, HgTe, or HgS, and can have a core-shell structure. Here, the core includes a material selected from the group consisting of CdSe, CdTe, CdS, ZnSe, ZnTe, ZnS, HgTe, and HgS, and the shell includes a material selected from the group consisting of CdSe, CdTe, CdS, ZnSe, ZnTe, ZnS, HgTe, and HgS. In addition, the quantum dot can be a III-V compound such as GaN, InP, InAs, GaAs, GaP, or GaInP.

Blue PL: at least an inorganic fluorescent material of a quantum dot selected from the group consisting of $(Sr,Mg,Ca)_{10}(PO_4)_6Cl_2:Eu^{2+}$; $BaMgAl_{10}O_{17}:Eu^{2+}$; $BaMg_2Al_{16}O_{27}:Eu^{2+}$. The quantum dot can be a II-VI compound such as CdSe, CdTe, CdS, ZnSe, ZnTe, ZnS, HgTe, or HgS, and can have a core-shell structure. Here, the core includes a material selected from the group consisting of CdSe, CdTe, CdS, ZnSe, ZnTe, ZnS, HgTe, and HgS, and the shell includes a material selected from the group consisting of CdSe, CdTe, CdS, ZnSe, ZnTe, ZnS, HgTe, and HgS. In addition, the quantum dot can be a III-V compound such as GaN, InP, InAs, GaAs, GaP, or GaInP.

White reflection: $TiO_2$, barium sulfate, kaolin, zinc oxide, zirconium oxide, or combinations thereof.

Operations in the Reflection Mode (In Case of a Blue Pixel)

Figure 4A:
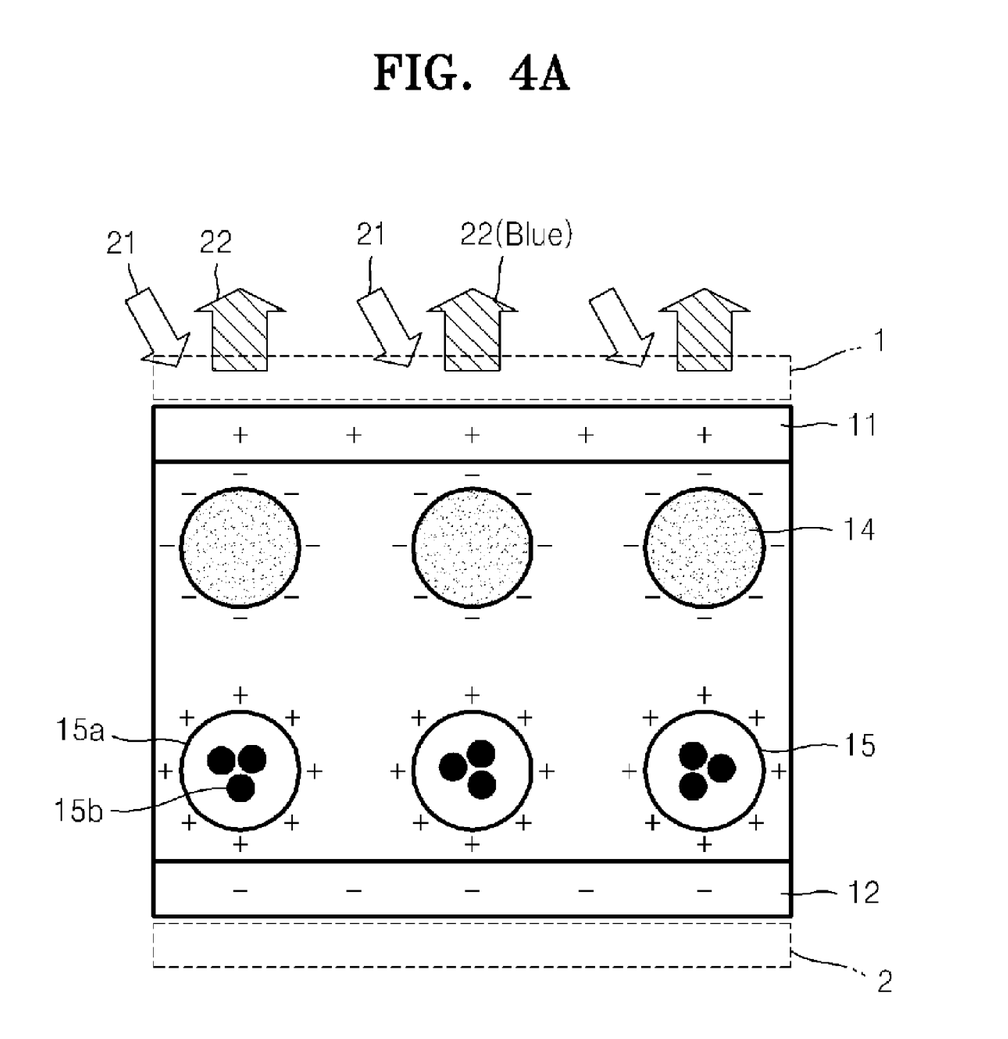
FIGS. 4A and 4B are diagrams illustrating exemplary operations in a reflection mode of the electrophoretic display device.
Figure 4B:
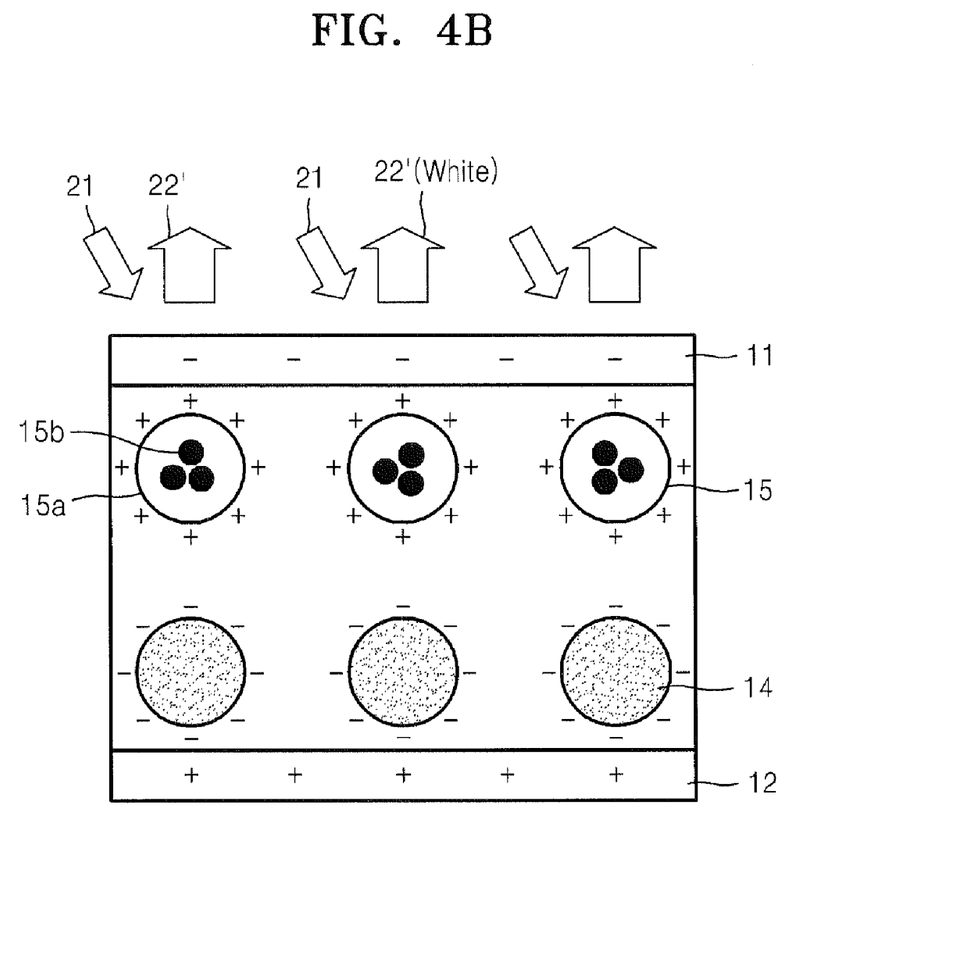

FIGS. 4A and 4B are diagrams showing an image display in the reflection mode in a case where the external light 21 is the natural light.

As shown in FIG. 4A, the reflective particles 14 and the light emission particles 15 are disposed between a first electrode 11 and a second electrode 12, which are formed on inner surfaces of a first substrate 1 and a second substrate 2 facing each other. The first electrode 11 is positively charged, and the second electrode 12 is negatively charged. Due to the above charging operations, the reflective particles 14 having the negative charges move toward the first electrode 11 and the light emission particles 15 having the positive charges move toward the second electrode 12. Here, the external light 21 is incident on to the first electrode 11, and then, the blue light is reflected by the reflective particles 14 close to the first electrode 11, and other red and green visible lights and UV rays are absorbed by the reflective particles. Therefore, the blue reflected light 22 is the output through the first substrate 1, and the display device displays the blue color.

As shown in FIG. 4B, when the voltages applied to the first electrode 11 and the second electrode 12 are changed such that the first electrode 11 is charged negatively and the second electrode 12 is charged positively, the light emission particles 15 having the positive charges move toward the first electrode 11 and the reflective particles 14 having the negative charges move toward the second electrode 12. Here, the external light 21 is incident on the coating layers 15a of the light emission particles 15 close to the first electrode 11 and therefore reflect the external light incident upon the coating layer 15a. Since the coating layer 15a is white, a white reflected light 22' is output through the first substrate (refer to reference number 1 of FIG. 4A), and the display device displays the a white color.

As described above, in the reflection mode, two colors, namely, the blue and the white colors can be represented by the light reflected by the reflective particles and the light reflected by the light emission particles.

Operations in the Light Emission Mode (in Case of a Blue Pixel)

Figure 5A:
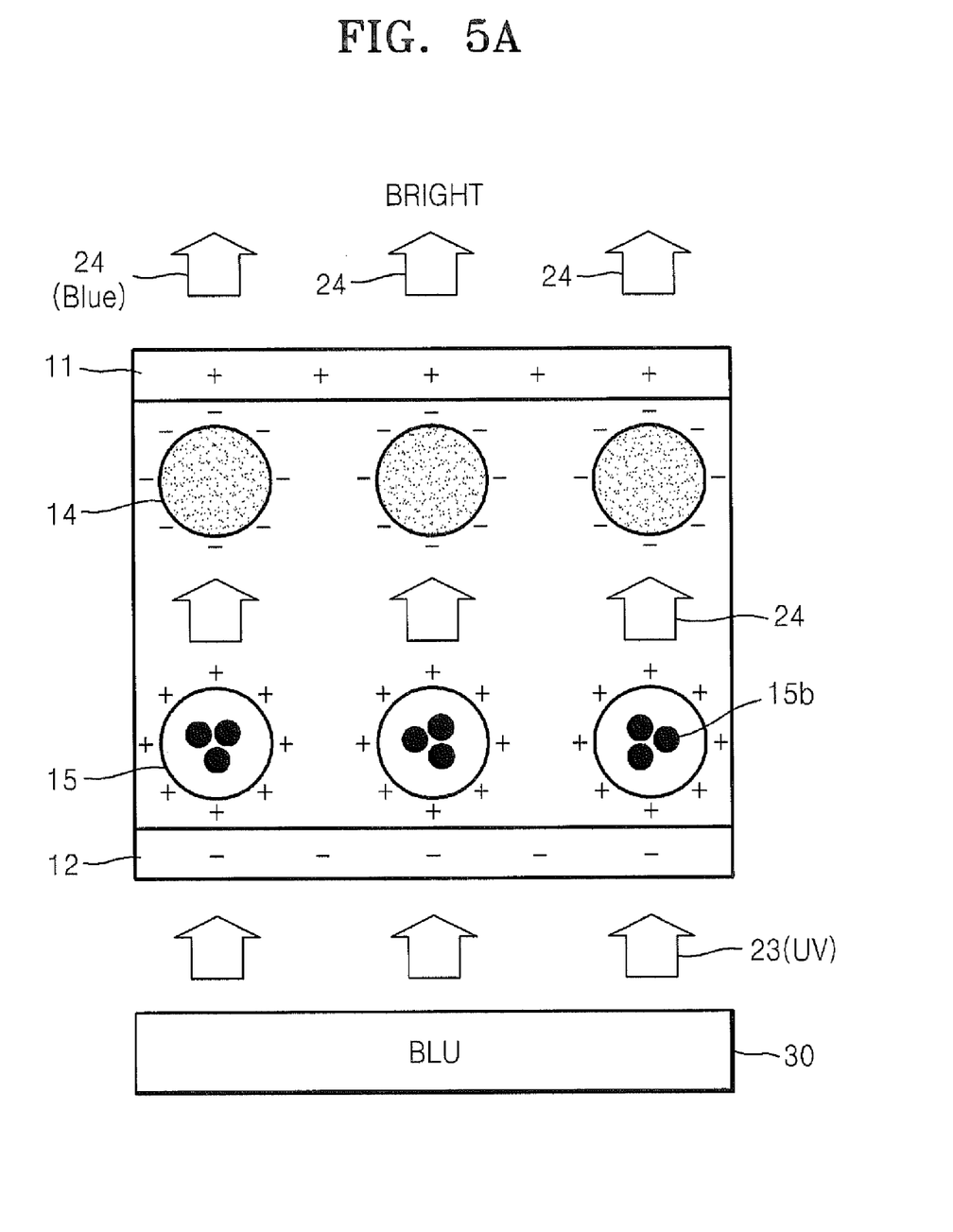
FIGS. 5A and 5B are diagrams illustrating exemplary operations in a light emission mode of the electrophoretic display device.
Figure 5B:
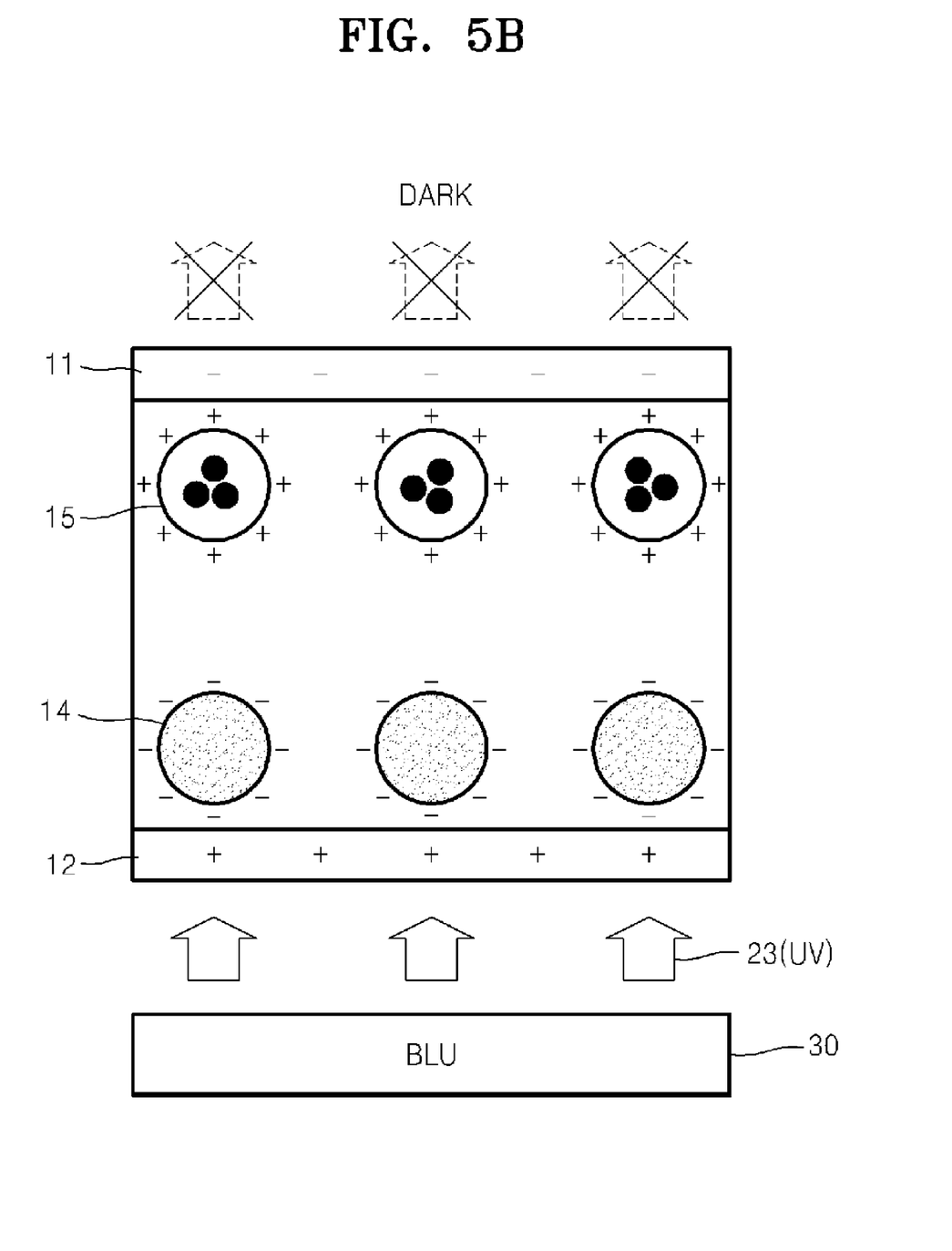

FIGS. 5A and 5B show operations of the display device in the light emission mode for displaying images in a dark place.

As shown in FIG. 5A, the reflective particles 14 (having negative charges) and the light emission particles 15 are disposed between the first electrode 11 and the second electrode 12 facing each other. Here, the first electrode 11 is positively charged and the second electrode 12 is negatively charged. Therefore, the reflective particles 14 having the negative charges move toward the first electrode 11, and the light emission particles 15 having the positive charges move toward the second electrode 12. At this time, UV rays 23 emitted from the backlight unit (BLU) 30 are incident upon and travel through the second electrode 12, and the light emission particles 15 that are close to the second electrode 12 emit the color of light. The light is actually emitted from the PL material 15b within the coating layer 15a. The visible light of a certain wavelength range emitted from the PL material 15b, for example, the blue light 24, is reflected by the reflective particles 14 that are close to the first electrode 11 and/or transmits through the reflective particles to be output through the first substrate 1. Here, the UV rays 23 emitted from the BLU 30 are absorbed by the light emission particles. Part of the UV rays can be absorbed by the reflective particles 14. Therefore, a blue color is displayed when the display device is seen from the direction of the first electrode 11 in a dark place.

As shown in FIG. 5B, when the voltages applied to the first electrode 11 and the second electrode 12 are changed such that the first electrode 11 is charged to negative and the second electrode 12 is charged to positive, the light emission particles 15 having the positive charges move toward the first electrode 11 and the reflective particles 14 having the negative charges move toward the second electrode 12. Here, the lights 23 emitted from the BLU 30 are incident into the reflective particles 14 through the second electrode 12, and the reflective particles including the UV absorbents absorb most of the UV rays and in addition block the UV rays. As a result, the UV rays cannot proceed toward the light emission particles 15. Therefore, the light emission particles 15 cannot emit light. In other words, the reflective particles 14 prevent the UV rays 23 from proceeding toward the light emission particles 15, and the black color can be represented.

Therefore, the blue and black colors can be displayed in the light emission mode in the dark place.

Operation of Electrophoretic Color Display

As described above, the blue pixel of the display structure includes the reflective particles that reflect the blue light and the light emission particles coated with a white coating layer as a result of which they emit the blue light. In a similar manner, a green pixel can include reflective particles reflecting green light and light emission particles coated with a white coating layer and as a result of which they emit green light. In addition, a red pixel can include a reflective particle that reflects red light and light emission particles coated by a white coating layer as a result of which they emit the red light.

For example, if the light emission particle includes the blue PL material, the reflective particle is formed of a material that reflects the blue light. If the light emission particle includes the red PL material, the reflective particle is formed of the material that reflects the red light. Further, if the light emission particle includes the green PL material, the reflective particle is formed of the material that reflects the green light.

The display device can include the red, blue, and green pixel regions like the general color display device, and thus, the desired color display device can be obtained.

The present invention can be applied to the display device using the movement of particles, and in particular, the reflection mode and the light emission mode can be selected, and thus, the display device can be applied to wide variety of applications.

As described above, the reflective particle and the light emission particle opposing polarities when compared with each other can be used, and thus, the display device that can be used in both bright places as well as dark places. The display device operates as a reflective display device in a bright place where there is an external light, and operates as a light emitting display device in a dark place.

While the disclosed embodiments have been shown and described with reference to exemplary embodiments thereof, it will be understood by those of ordinary skill in the art that various changes in form and details may be made therein without departing from the spirit and scope of the present invention as defined by the following claims.

In addition, many modifications can be made to adapt a particular situation or material to the teachings of the invention without departing from the essential scope thereof. Therefore, it is intended that the invention not be limited to the particular embodiments disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguished one element from another. Furthermore, the use of the terms a, an, etc. do not denote a limitation of quantity, but rather denote the presence of at least one of the referenced item.

What is claimed is:

1. An electrophoretic display device comprising:
   a plurality of pixel regions;
   reflective particles formed in the pixel regions, the reflective particles having a first electric polarity and reflecting a first light in the visible regime of the electromagnetic spectrum; and
   light emission particles formed in the pixel regions, the light emission particles having a second electric polarity and emitting a second light due to an optical stimulation, the first and second lights being of substantially the same wavelength and occurring substantially in the same pixel region.

2. The electrophoretic display device of claim 1, wherein each of the light emission particles reflects the light reflected by the reflective particles, and emits the light having substantially the same wavelength as that of the reflected light by the optical stimulation.

3. The electrophoretic display device of claim 1, wherein each of the light emission particles includes a light emitting material for emitting the second light; and a coating layer coated on the light emitting material; wherein the coating layer transmits the optical stimulation and the second light emitted from the light emitting material.

4. The electrophoretic display device of claim 3, wherein the light emitting material includes a photoluminescence (PL) material.

5. The electrophoretic display device of claim 4, wherein the PL material includes a material emitting a blue color, a green color or a red color by the optical stimulation.

6. The electrophoretic display device of claim 3, wherein the coating layer reflects a white light.

7. The electrophoretic display device of claim 1, wherein each of the reflective particles includes a first material reflecting the first light and a second material absorbing the optical stimulation.

8. The electrophoretic display device of claim 7, wherein the first material reflects blue light, green light, or red light.

9. An electrophoretic display device comprising:
   a first substrate and a second substrate forming a space therebetween for receiving electrophoretic particles; and
   a first electrode and a second electrode formed on the first substrate and the second substrate, respectively, and the first and second electrodes defining a plurality of pixel regions,
   wherein the electrophoretic particles include:
   reflective particles having a first electric polarity and reflecting a first light in the visible regime of the electromagnetic spectrum; and
   light emission particles having a second electric polarity and emitting a second light due to an optical stimulation, the first and second lights being of substantially the same wavelength and occurring substantially in the same pixel region.

10. The electrophoretic display device of claim 9, wherein each of the light emission particles reflects the light reflected by the reflective particles, and emits the light having substantially the same wavelength as that of the reflected light by the optical stimulation.

11. The electrophoretic display device of claim 9, wherein each of the light emission particles includes a light emitting material for emitting the second light; and a coating layer coated on the light emitting material; and wherein the coating layer transmits the optical stimulation and the second light emitted from the light emitting material.

12. The electrophoretic display device of claim 11, wherein the light emitting material includes a photoluminescence (PL) material.

13. The electrophoretic display device of claim 12, wherein the PL material includes a material emitting a blue color, a green color or a red color due to the optical stimulation.

14. The electrophoretic display device of claim 11, wherein the coating layer reflects a white light.

15. The electrophoretic display device of claim 9, wherein each of the reflective particles includes a first material reflecting the first light and a second material absorbing the optical stimulation.

16. The electrophoretic display device of claim 15, wherein the first material reflects blue light, green light, or red light.

17. The electrophoretic display device of claim 9, wherein each of the light emission particles includes a light emitting material and a coating layer coated on the light emitting material, and the coating layer transmits UV rays and a light emitted from the light emitting material.

18. The electrophoretic display device of claim 17, wherein the coating layer of the light emission particles is white.

19. The electrophoretic display device of claim 9, wherein each of the reflective particles includes a UV ray absorbing material.

* * * * *